(12) United States Patent
Oikawa et al.

(10) Patent No.: US 11,597,230 B2
(45) Date of Patent: Mar. 7, 2023

(54) VOLUME HOLOGRAM SHEET TO BE EMBEDDED, FORGERY PREVENTION PAPER, AND CARD

(71) Applicant: Dai Nippon Printing Co., Ltd., Tokyo (JP)

(72) Inventors: Nobuko Oikawa, Tokyo (JP); Minoru Azakami, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/372,944

(22) Filed: Jul. 12, 2021

(65) Prior Publication Data

US 2021/0339555 A1    Nov. 4, 2021

Related U.S. Application Data

(63) Continuation of application No. 16/376,410, filed on Apr. 5, 2019, now Pat. No. 11,077,698, which is a
(Continued)

(30) Foreign Application Priority Data

Jan. 19, 2010  (JP) .................................. 2010-009417
Mar. 3, 2010  (JP) .................................. 2010-046990

(51) Int. Cl.
*B42D 25/328*    (2014.01)
*B42D 25/455*    (2014.01)
(Continued)

(52) U.S. Cl.
CPC ............ *B42D 25/328* (2014.10); *B29C 65/48* (2013.01); *B29C 65/482* (2013.01);
(Continued)

(58) Field of Classification Search
CPC .................................................... B42D 25/328
See application file for complete search history.

(56) References Cited

U.S. PATENT DOCUMENTS 4,889,366 A * 12/1989 Fabbiani .............. B42D 25/364
283/77
6,066,378 A    5/2000 Morii et al.
(Continued)

FOREIGN PATENT DOCUMENTS

DE    102006047721 A1    5/2007
EP        1168111 A2    1/2002
(Continued)

OTHER PUBLICATIONS

Huntsman; A Guide to thermoplastic polyurethanes (TPU); 26 pages (Copyright 2010) (Year 2010).
(Continued)

*Primary Examiner* — Kyle R Grabowski
(74) *Attorney, Agent, or Firm* — Locke Lord LLP (57) ABSTRACT

An object of the present invention is to provide a thin volume hologram sheet to be embedded sufficiently resistant to a mechanical stress such as a stress including a tensile stress, a shear stress and a compression stress at the time of processing even under a heating condition, a forgery prevention paper and a card using the same. The object is achieved by providing a volume hologram sheet to be embedded comprising a volume hologram layer, and a substrate disposed only on one side surface of the volume hologram layer using an adhesion means, wherein a peeling strength of the volume hologram layer and the substrate is 25 gf/25 mm or more.

5 Claims, 4 Drawing Sheets

Related U.S. Application Data continuation of application No. 15/435,973, filed on Feb. 17, 2017, now abandoned, which is a continuation of application No. 13/521,757, filed as application No. PCT/JP2011/050765 on Jan. 18, 2011, now abandoned.

(51) Int. Cl.

| | | |
|---|---|---|
| *B42D 25/46* | (2014.01) | |
| *G03H 1/00* | (2006.01) | |
| *G03H 1/02* | (2006.01) | |
| *B29C 65/48* | (2006.01) | |
| *B42D 25/41* | (2014.01) | |
| *B42D 25/355* | (2014.01) | |
| *B42D 25/47* | (2014.01) | |
| *B42D 25/475* | (2014.01) | |
| *B29C 65/00* | (2006.01) | |
| *G09F 3/00* | (2006.01) | |
| *C09D 11/02* | (2014.01) | |
| *D21H 21/42* | (2006.01) | |
| *B29C 65/82* | (2006.01) | |
| *B32B 37/12* | (2006.01) | |
| *C09J 7/35* | (2018.01) | |
| *B32B 7/12* | (2006.01) | |
| *B32B 27/08* | (2006.01) | |
| *B32B 27/32* | (2006.01) | |
| *B32B 27/36* | (2006.01) | |
| *B32B 37/18* | (2006.01) | |
| *C09D 11/037* | (2014.01) | |
| *C09D 11/106* | (2014.01) | |
| *C09D 127/06* | (2006.01) | |
| *C09D 131/04* | (2006.01) | |
| *C09D 133/14* | (2006.01) | |
| *C09J 11/06* | (2006.01) | |
| *C09J 133/08* | (2006.01) | |
| *D21H 21/40* | (2006.01) | |
| *B29L 17/00* | (2006.01) | |
| *B29K 633/00* | (2006.01) | |
| *B29K 667/00* | (2006.01) | |

(52) U.S. Cl.
CPC ........ *B29C 65/483* (2013.01); *B29C 65/8223* (2013.01); *B29C 66/1122* (2013.01); *B29C 66/45* (2013.01); *B29C 66/71* (2013.01); *B29C 66/712* (2013.01); *B29C 66/733* (2013.01); *B32B 7/12* (2013.01); *B32B 27/08* (2013.01); *B32B 27/32* (2013.01); *B32B 27/36* (2013.01); *B32B 37/12* (2013.01); *B32B 37/182* (2013.01); *B42D 25/355* (2014.10); *B42D 25/41* (2014.10); *B42D 25/455* (2014.10); *B42D 25/46* (2014.10); *B42D 25/47* (2014.10); *B42D 25/475* (2014.10); *C09D 11/02* (2013.01); *C09D 11/037* (2013.01); *C09D 11/106* (2013.01); *C09D 127/06* (2013.01); *C09D 131/04* (2013.01); *C09D 133/14* (2013.01); *C09J 7/35* (2018.01); *C09J 11/06* (2013.01); *C09J 133/08* (2013.01); *D21H 21/40* (2013.01); *D21H 21/42* (2013.01); *G03H 1/0011* (2013.01); *G03H 1/0248* (2013.01); *G03H 1/0252* (2013.01); *G09F 3/0292* (2013.01); *B29C 65/485* (2013.01); *B29C 66/72328* (2013.01); *B29K 2633/00* (2013.01); *B29K 2667/003* (2013.01); *B29L 2017/001* (2013.01); *B32B 2037/1253* (2013.01); *B32B 2305/347* (2013.01); *B32B 2307/542* (2013.01); *B32B 2310/0843* (2013.01); *B32B 2310/14* (2013.01); *B32B 2317/12* (2013.01); *B32B 2333/00* (2013.01); *B32B 2367/00* (2013.01); *B32B 2425/00* (2013.01); *C09J 2301/414* (2020.08); *C09J 2433/00* (2013.01); *G03H 2240/50* (2013.01); *G03H 2250/35* (2013.01)

(56) References Cited

U.S. PATENT DOCUMENTS

| | | |
|---|---|---|
| 6,308,630 B1 | 10/2001 | Kurokawa et al. |
| 6,596,360 B2 | 7/2003 | Toshine et al. |
| 2001/0046630 A1 | 11/2001 | Toshine et al. |
| 2003/0124436 A1 | 7/2003 | Shioda et al. |
| 2006/0019172 A1* | 1/2006 | Ohtaki ................. G03H 1/0256 430/1 |
| 2006/0275671 A1 | 12/2006 | Eto et al. |
| 2010/0104952 A1 | 4/2010 | Azakami et al. |
| 2010/0165425 A1 | 7/2010 | Tompkin et al. |
| 2015/0220056 A1 | 8/2015 | Weiser et al. |

FOREIGN PATENT DOCUMENTS

| | | |
|---|---|---|
| JP | 2002-307879 A | 10/2002 |
| JP | 2003-213597 A | 7/2003 |
| JP | 2003-306896 A | 10/2003 |
| JP | 2004-037623 A | 2/2004 |
| JP | 2007-108253 A | 4/2007 |
| WO | 2008105510 A1 | 9/2008 |

OTHER PUBLICATIONS

International Search Report dated Feb. 22, 2011; PCT/JP2011/050765.
Extended European Search Report dated Sep. 12, 2013; Appln. No. 11734636.1.
USPTO NFOA dated Nov. 29, 2013 in connection with U.S. Appl. No. 13/521,757.
USPTO FOA dated Apr. 22, 2014 in connection with U.S. Appl. No. 13/521,757.
USPTO NFOA dated Nov. 10, 2014 in connection with U.S. Appl. No. 13/521,757.
USPTO FOA dated Mar. 13, 2015 in connection with U.S. Appl. No. 13/521,757.
USPTO NFOA dated Jul. 22, 2015 in connection with U.S. Appl. No. 13/521,757.
USPTO FOA dated Oct. 30, 2015 in connection with U.S. Appl. No. 13/521,757.
USPTO FOA dated Feb. 11, 2016 in connection with U.S. Appl. No. 13/521,757.
USPTO FOA dated Aug. 17, 2016 in connection with U.S. Appl. No. 13/521,757.
USPTO Notice of Abandonment dated Mar. 23, 2017 in connection with U.S. Appl. No. 13/521,757.
USPTO FOA dated Oct. 3, 2017 in connection with U.S. Appl. No. 15/435,973.
USPTO NFOA dated Apr. 12, 2018 in connection with U.S. Appl. No. 15/435,973.
USPTO FOA dated Nov. 9, 2018 in connection with U.S. Appl. No. 15/435,973.
USPTO NFOA dated Aug. 5, 2019 in connection with U.S. Appl. No. 16/376,410.
USPTO FOA dated Jan. 15, 2020 in connection with U.S. Appl. No. 16/376,410.
USPTO FOA dated Jun. 30, 2020 in connection with U.S. Appl. No. 16/376,410.
USPTO NFOA dated Nov. 17, 2020 in connection with U.S. Appl. No. 16/376,410.
USPTO Notice of Allowance dated Mar. 24, 2021 in connection with U.S. Appl. No. 16/376,410.

* cited by examiner

VOLUME HOLOGRAM SHEET TO BE EMBEDDED, FORGERY PREVENTION PAPER, AND CARD

TECHNICAL FIELD

The present invention relates to a volume hologram sheet to be embedded used for applications such as a forgery prevention paper and a card.

BACKGROUND ART

Hologram is a technology with the wave front of the object light beam recorded as interference fringes on a photosensitive material by interference of two light beams of the same wavelength (an object light beam and a reference light beam) so as to generate the diffraction phenomenon by the interference fringes when a light beam of the wavelength same as that of the reference light beam at the time of recording the interference fringes is directed for reproducing the wave front same as that of the original object light beam. Since such a hologram has advantages such as a beautiful external appearance and difficulty in copy production, it is often used for security application, and the like. In particular, in the field of plastic cards represented by credit cards and cash cards, cards with a hologram have widely been used mainly in terms of preventing copy production and providing a design value.

The hologram can be classified into several groups according to the recording form of the interference fringes. Representatives are the surface relief hologram and the volume hologram. Here, the surface relief hologram has a hologram image recorded by forming a minute rugged pattern on the hologram layer surface. On the other hand, the volume hologram has a hologram image recorded by providing three-dimensionally in the thickness direction interference fringes generated by interference of a light as fringes of different refractive indices. Among them, since the volume hologram has a hologram image recorded by the refractive index difference of the materials, it is advantageous in that copying thereof is difficult compared with the relief hologram so that applications as forgery prevention means of securities and cards are expected.

Many examples are known for use of the holograms as forgery prevention means or design improving means. As an example thereof, a thread hologram used for various paper media is presented.

The thread hologram is formed in a part of the paper medium for the purpose of forgery prevention of a paper medium with a property value such as securities. Since such a thread hologram is formed only in a part of the paper medium, a high forgery prevention effect can be performed and a design property can be provided to the paper medium, the surface relief hologram is nowadays used widely for various paper media. Moreover, the forgery prevention performance can be improved by using a volume hologram for the hologram.

The paper medium with the thread hologram formed is produced in general by introducing a hologram sheet for thread into the paper medium at the time of making a paper medium. Here, in the step of introducing the hologram sheet for a thread into the paper medium (hereafter, it may be referred to as the introducing step), since the hologram sheet for a thread is introduced into the paper medium in general by being drawn mechanically under a heating condition, in order to endure the introducing step, the hologram sheet for a thread should have a high mechanical strength with respect to the tensile stress or shear stress under the heating condition, that is, a high mechanical resistance with respect to a mechanical stress such as the tensile stress and the shear stress.

Here, the Patent Literature 1 discloses a technique of providing a high endurance under a heating condition by making the layer configuration of a volume hologram sheet for a thread of a first protection layer/a volume hologram layer/a second protection layer as the hologram sheet for a thread of the volume hologram. However, although the volume hologram for a thread sheet of the Patent Literature 1 has the resistance with respect to the mechanical stress such as the tensile stress and the shear stress under a heating condition to some extent, since the film thickness is bulky due to the need of the two layers of the protection layer, the paper medium with the volume hologram sheet for a thread introduced has ruggedness on the surface so that it is problematic in that the paper medium with a smooth surface can hardly be obtained.

Therefore, a thin film volume hologram sheet for a thread with the excellent resistance with respect to the mechanical stress such as the tensile stress and the shear stress under a heating condition has been desired.

Moreover, as another example of using the hologram as a forgery prevention means or a design property improving means, a card with the hologram is known.

As a method for providing a hologram to a card, for example, a method of attaching a hologram seal, a method of transferring a hologram from a hologram transfer foil, and a method of embedding a hologram in a card medium so as to be visible from the outside can be presented.

Although the method of attaching a hologram seal and the method of transferring a hologram are simple, there are risks of the hologram being peeled off and used for a different purpose. In particular, the volume hologram tends to be thicker than the surface relief hologram due to its characteristic of recording a hologram image by the three-dimensional arrangement of a refractive index difference. Therefore, a grade difference may be generated on the card surface due to the volume hologram thickness so as to deteriorate the design properties and lead to forgery by easiness in peeling off the hologram.

On the other hand, in the case of the method of embedding a hologram in a card medium, forgery can be prevented because it is difficult to peel off the hologram. For example, the Patent Literature 2 discloses a card with a hologram disposed between a core sheet and an over sheet. According to such a card, since the over sheet is thicker than the hologram, the trouble derived from the grade difference due to the volume hologram thickness can be alleviated.

At the time of embedding a hologram in a card medium, for example, as mentioned in the Patent Literature 2, the core sheet and the over sheet with the hologram disposed are laminated and integrated by press-lamination under a heating condition. At the time, in the case the hologram has the hologram layer formed on a substrate, a problem is involved in that the air enveloped in the hologram goes out for generating bubbles between the substrate and the hologram layer at the time of heat press so as to cause exfoliation of the hologram layer. Moreover, it is also problematic that the substrate and the hologram layer are displaced at the time of the heat press. Therefore, in order to endure such a step, the hologram should have a high resistance with respect to the mechanical stress such as compression stress under a heating condition.

As heretofore mentioned, a hologram sheet to be embedded used in the case of introducing the same into a paper medium or embedding the same into a card medium is desired to have the excellent resistance with respect to a mechanical stress under a predetermined heating condition.

CITATION LIST

Patent Literature

Patent Literature 1: Japanese Patent Application Publication Laid-Open (JP-A) No. 2007-108253
Patent Literature 2: JP-A No. 2002-307879

SUMMARY OF INVENTION

Technical Problem

The present invention has been achieved in view of the above-mentioned circumstances, and its main object is to provide a thin volume hologram sheet to be embedded sufficiently resistant to a mechanical stress at the time of processing even under a heating condition, a forgery prevention paper and a card using the same.

Solution to Problem

In order to obtain a thin volume hologram sheet for a thread to be introduced into a paper medium under a heating condition as described above, the present inventors have tried to provide a resistance to a sufficient mechanical stress such as a tensile stress and a shear stress at the time of processing under a heating condition as described above to a volume hologram sheet having a layer configuration of a volume hologram layer and a substrate disposed only on one side surface of the volume hologram layer. Moreover, in order to obtain a thin volume hologram sheet for a card to be embedded into a card medium under a heating condition as mentioned above, the present inventors have tried to provide a sufficient resistance to a mechanical stress such as a compression stress to a volume hologram sheet at the time of processing under a heating condition as described above. Then, as a result of elaborate study, they have found out that a sufficient resistance to a mechanical stress such as a stress including a tensile stress, a shear stress and a compression stress can be realized at the time of processing even under a heating condition as described above by having the peeling strength of the volume hologram layer and the substrate of 25 gf/25 mm or more so as to complete the present invention.

That is, the present invention provides a volume hologram sheet to be embedded comprising: a volume hologram layer, and a substrate disposed only on one side surface of the volume hologram layer using an adhesion means, wherein a peeling strength of the volume hologram layer and the substrate is 25 gf/25 mm or more.

According to the present invention, since the peeling strength of the volume hologram layer and the substrate is 25 gf/25 mm or more, at the time of producing a forgery prevention paper, a card, and the like using the volume hologram sheet to be embedded under a heating condition, a volume hologram sheet to be embedded can be provided with a resistance to a mechanical stress such as a tensile stress, a shear stress and a compression stress to the extent that problems including exfoliation of the volume hologram layer, bubble generation between the volume hologram layer and the substrate, and displacement of the volume hologram layer and the substrate are not generated. Moreover, since the volume hologram sheet to be embedded can be provided as a thin film, even in the case of introducing the same in a paper medium in the introducing step or in the case of embedding the same in a card medium, the surface of the paper medium or the card can be smooth.

In the present invention, it is preferable that a main component of a resin material used in the volume hologram layer is an acrylic resin material, and the substrate is made of a polyester resin. Since the volume hologram layer containing a resin material as the main component and the substrate made of the resin are used, at the time of producing a forgery prevention paper, a card, and the like under a heating condition, a preferable mechanical strength with respect to a stress such as a tensile stress, a shear stress and a compression stress can be provided.

In the present invention, it is preferable that the adhesion means is an adhesive layer, and an adhesive used for the adhesive layer is a curable adhesive. Since a curable adhesive is used for the adhesive layer, at the time of producing a forgery prevention paper, a card, and the like under a heating condition, the volume hologram sheet to be embedded of the present invention is provided with a preferable resistance with respect to a mechanical stress such as a tensile stress, a shear stress, and a compression stress.

In the present invention, it is preferable that the adhesion means is an easy adhesion process, and the easy adhesion process is a chemical process using a primer agent. Since the chemical process using a primer agent is carried out, the volume hologram sheet to be embedded of the present invention is provided with a preferable resistance with respect to a mechanical stress such as a tensile stress, a shear stress, and a compression stress at the time of producing a forgery prevention paper, a card, and the like under a heating condition.

It is preferable that the volume hologram sheet to be embedded of the present invention is a volume hologram sheet for a thread. According to the present invention, since the peeling strength of the volume hologram layer and the substrate is 25 gf/25 mm or more, at the time of producing a forgery prevention sheet, and the like using the volume hologram sheet for a thread under a heating condition, a volume hologram sheet for a thread having a mechanical strength with respect to tensile stress and a shear stress to the extent that a problem of exfoliation of the volume hologram layer, and the like is not generated can be provided. Moreover, since the volume hologram sheet for a thread can be a thin film, the paper medium surface can be made smooth even in the case of being introduced into a paper medium in the introducing step.

Moreover, it is also preferable that the volume hologram sheet to be embedded of the present invention is a volume hologram sheet for a card. According to the present invention, since the peeling strength of the volume hologram layer and the substrate is 25 gf/25 mm or more, at the time of producing a card using the volume hologram sheet for a card under a heating condition, a volume hologram sheet for a card having a resistance with respect to a mechanical stress such as a compression stress to the extent that problems such as the bubble generation between the volume hologram layer and the substrate, and the displacement of the volume hologram layer and the substrate are not generated can be provided.

The present invention provides a forgery prevention paper, wherein the above-mentioned volume hologram sheet to be embedded is used.

Moreover, the present invention provides a card, wherein the above-mentioned volume hologram sheet to be embedded is disposed between two sheets.

According to the present invention, since the volume hologram sheet to be embedded is used, a problem is not involved at the time of the production, and a high forgery prevention effect can be performed.

Advantageous Effects of Invention

In the present invention, since the peeling strength of the volume hologram layer and the substrate is 25 gf/25 mm or more, a thin volume hologram sheet to be embedded can be provided with a sufficient resistance with respect to a mechanical stress such as a tensile stress, a shear stress and a compression stress even at the time of processing under a heating condition.

DESCRIPTION OF EMBODIMENTS

Hereafter, the volume hologram sheet to be embedded, the forgery prevention paper and the card of the present invention will be explained, respectively.

A. Volume Hologram Sheet to be Embedded

The volume hologram sheet to be embedded of the present invention comprises; a volume hologram layer, and a substrate disposed only on one side surface of the volume hologram layer using an adhesion means, characterized in that a peeling strength of the volume hologram layer and the substrate is 25 gf/25 mm or more.

Here, the peeling strength in the present invention is a value measured based on the 180 degree peeling test of JIS Z0237. The tensile tester to be used is for example an Instron 5565 type™ material tester. A test piece is prepared by cutting a hologram sheet by a 25 mm width and a 150 mm length, attaching a double side adhesive tape of the same size on the volume hologram layer side, and further attaching the same onto a SUS plate so as to be fixed for peeling off the substrate film by a 300 mm per minute rate for measuring the tensile load (gf) in a state with the peeling operation carried out stably as the peeling strength of the 25 mm width. Moreover, as to a sample of less than a 25 mm width, with the width thereof being "a" mm, the value obtained by multiplying the peeling strength measured in the same manner for the "a" mm width by 25/a is regarded as the peeling strength of the 25 mm width.

Figure 1:
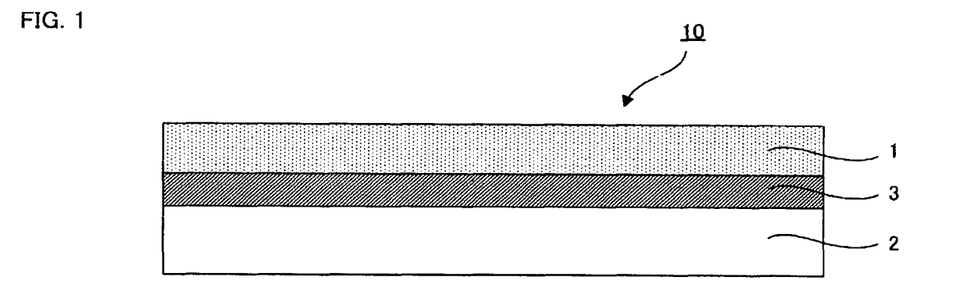
FIG. 1 is a schematic cross-sectional view showing an embodiment of a volume hologram sheet to be embedded of the present invention.

Next, the volume hologram sheet to be embedded of the present invention will be explained with reference to the drawings. FIG. 1 is a schematic cross-sectional view showing an embodiment of a volume hologram sheet to be embedded of the present invention. As shown in FIG. 1, the volume hologram sheet to be embedded 10 of the present invention comprises a volume hologram layer 1, and a substrate 2 disposed on only on one side surface of the volume hologram layer 1 using an adhesive layer 3.

Figure 2:
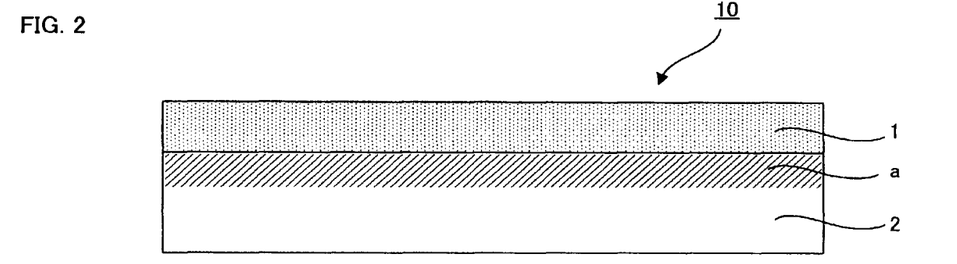
FIG. 2 is a schematic cross-sectional view showing another embodiment of a volume hologram sheet to be embedded of the present invention.

Moreover, in the present invention, the volume hologram layer 1 and the substrate 2 may be bonded and disposed by applying an easy adhesion process "a" to the surface of the substrate 2 as shown in FIG. 2 instead of using the adhesive layer 3 as the adhesion means as shown in FIG. 1. Moreover, either in the case of using the adhesive layer 3 or the easy adhesion process "a" as the adhesion means, the present invention is characterized in that the peeling strength of the volume hologram layer 1 and the substrate 2 is 25 gf/25 mm or more.

Here, at the time of producing a forgery prevention paper, and the like using the volume hologram sheet to be embedded (volume hologram sheet for a thread), since the volume hologram sheet for a thread is introduced into a paper medium by mechanically drawing under a heating condition, a resistance with respect to a mechanical stress such as a tensile stress and a shear stress under a heating condition is indispensable to the extent that it can endure the process. According to a volume hologram sheet for a thread having a layer configuration of a first protection layer/a volume hologram layer/a second protection layer conventionally proposed, a resistance with respect to the mechanical stress such as a tensile stress and a shear stress under a heating condition can be provided to some extent. However, since the film thickness is bulky due to the need of the two layers of the protection layer, the paper medium with the volume hologram sheet for a thread introduced has ruggedness on the surface so that a problem is involved in that the paper medium with a smooth surface can hardly be obtained.

Moreover, at the time of embedding the volume hologram sheet to be embedded (volume hologram sheet for a card) in a card medium, since the card medium and the volume hologram sheet are pressed under a heating condition, the volume hologram sheet is required to have a resistance with respect to a mechanical stress such as a compression stress under a heating condition to the extent that it can endure such a process.

As heretofore mentioned, it is desired that the volume hologram sheet to be embedded such as a volume hologram sheet for a thread and a volume hologram sheet for a card has the excellent resistance with respect to a mechanical stress under a heating condition.

Then, the present inventors have tried to use a volume hologram sheet having a layer configuration of a volume hologram layer and a substrate disposed on only one side surface of the volume hologram layer for a volume hologram sheet for a thread or a volume hologram sheet for a card.

However, it was known that in the case the above-mentioned volume hologram sheet having the layer configuration is really introduced into a paper medium, the volume hologram sheet does not have a resistance with respect to a mechanical stress such as a tensile stress and a shear stress under a heating condition to the extent that it endures a process due to exfoliation of the volume hologram layer form the volume hologram sheet or exfoliation of the volume hologram layer. As a result of the elaborate discussion of the present inventors in order to solve the problem, it was found out that with a peeling strength of 25 gf/25 mm or more of the volume hologram layer and the substrate of the volume hologram sheet having the layer configuration in the above described peeling strength measuring method, problems of the exfoliation of the volume hologram layer, and the like are not generated in the case of producing a forgery prevention paper, and the like using the volume hologram sheet having the layer configuration under a heating condition.

Moreover, in the case of really embedding the volume hologram sheet having the layer configuration in a card medium, it was learned that the volume hologram layer is peeled off from the volume hologram sheet due to bubble generation between the substrate and the hologram layer, that the substrate and the hologram layer are displaced, and that the volume hologram sheet does not have a resistance with respect to a mechanical stress such as a compression stress under a heating condition to the extent that it can endure the process due to the bubbles between the substrate and the volume hologram layer and the displacement of the substrate and the hologram layer. As a result of the elaborate discussion of the present inventors in order to solve the problem, it was found out that the problems of bubble generation between the substrate and the volume hologram layer, displacement of the substrate and the volume hologram layer, and the like are not generated even in the case of producing a card using the volume hologram sheet having the layer configuration under a heating condition if the peeling strength of the volume hologram layer and the substrate of the volume hologram sheet having the layer configuration is 25 gf/25 mm or more in the above-mentioned measuring method of the peeling strength.

Based on these findings, the present inventors have completed the present invention.

According to the present invention, since the peeling strength of the volume hologram layer and the substrate is 25 gf/25 mm or more, even with the configuration having the substrate disposed using the adhesion means only on one side of the volume hologram layer, at the time of producing a forgery prevention paper, and the like using the volume hologram sheet to be embedded (volume hologram sheet for a thread), a volume hologram sheet to be embedded (volume hologram sheet for a thread) having a resistance with respect to a mechanical stress such as a tensile stress and a shear stress under a heating condition to the extent that the problems of the exfoliation of the volume hologram layer, and the like are not generated can be provided.

Moreover, since the volume hologram sheet to be embedded (volume hologram sheet for a thread) of the present invention has a configuration with the substrate disposed using the adhesion means only on one side of the volume hologram layer, the volume hologram sheet to be embedded (volume hologram sheet for a thread) can be provided as a thin film, and thus the paper medium surface can be made smooth in the case of introducing the same into a paper medium in the introducing step.

Moreover, according to the present invention, since the peeling strength of the volume hologram layer and the substrate is 25 gf/25 mm or more, even with the configuration having the substrate disposed using the adhesion means only on one side of the volume hologram layer, at the time of producing a card using the volume hologram sheet to be embedded, a volume hologram sheet to be embedded having a resistance with respect to a mechanical stress such as a compression stress under a heating condition to the extent that a problem of bubble generation between the volume hologram layer and the substrate, displacement of the volume hologram layer and the substrate, and the like is not generated can be provided.

Moreover, since the volume hologram sheet to be embedded of the present invention has a configuration with the substrate disposed using an adhesion means only on one side surface of the volume hologram layer, the volume hologram sheet to be embedded can be provided as a thin film so that the card surface can be made smooth in the case of embedding the same into a card medium.

Here, the "volume hologram sheet to be embedded" in the present invention denotes a volume hologram sheet used in the case of embedding a hologram in a medium. Examples include a volume hologram sheet for a thread used in the case of introducing a hologram into a paper medium and a volume hologram sheet for a card used in the case of embedding a hologram into a plastic card medium.

The "mechanical strength with respect to a tensile stress and a shear stress under a heating condition" in the present invention denotes a strength to the extent that both of the substrate and the volume hologram layer of the volume hologram sheet for a thread does not cause rupture, and the like by the tensile stress or the shear stress applied at the time of introducing the volume hologram sheet to be embedded (volume hologram sheet for a thread) of the present invention into a paper medium. In the present invention, to have "a mechanical strength with respect to a tensile stress or a shear stress under a heating condition" means to have "a resistance with respect to a mechanical stress such as a tensile stress and a shear stress under a heating condition".

The "resistance with respect to a mechanical stress such as a tensile stress and a shear stress under a heating condition" denotes the nature that peeling off is not generated between the substrate and the volume hologram layer of the volume hologram sheet for a thread so as not to generate rupture, fraying or wrinkles of the layers, and the like derived therefrom due to the tensile stress or the shear stress applied at the time of introducing the volume hologram sheet to be embedded (volume hologram sheet for a thread) of the present invention into a paper medium.

Moreover, the "resistance with respect to a mechanical stress such as a compression stress under a heating condition" in the present invention denotes the nature that bubbles between the volume hologram layer and the substrate, displacement of the volume hologram layer and the substrate, and the like are not generated by the compression stress applied at the time of embedding the volume hologram sheet to be embedded (volume hologram sheet for a card) of the present invention into a card medium.

Hereafter, the "resistance with respect to a mechanical stress such as a tensile stress and a shear stress" and the "resistance with respect to a mechanical stress such as a compression stress" may be referred to as simply the resistance with respect to a mechanical stress.

The "heating condition" specifically denotes a heating condition at the time of introducing the volume hologram sheet to be embedded (volume hologram sheet for a thread) of the present invention into a paper medium, and a heating condition at the time of embedding the volume hologram sheet to be embedded of the present invention into a card medium. The heating condition at the time of introducing the volume hologram sheet to be embedded into a paper medium specifically represents a heating condition in a range of 90° C. to 110° C. Moreover, the heating condition at the time of introducing the volume hologram sheet to be embedded into a card medium specifically represents a heating condition in a range of 120° C. to 180° C.

Moreover, in the present invention, the condition of providing a sufficient resistance with respect to a mechanical stress at the time of processing under a heating condition of the volume hologram sheet to be embedded is found out to be the peeling strength of 25 gf/25 mm or more of the volume hologram layer and the substrate. By use of the condition, effects of effectively carrying out design before production of the volume hologram sheet to be embedded and inspection after production can also be achieved.

Specifically, in the case of producing the volume hologram sheet to be embedded, it can be carried out while adjusting the composition of the materials used for each member, designing a combination of the members, and the like so that the peeling strength of the volume hologram layer and the substrate becomes in the above-mentioned range.

Moreover, the produced volume hologram sheet to be embedded can be subjected to inspection for the peeling strength of the volume hologram layer and the substrate to know whether it can be used or not.

Hereafter, the configurations used in the volume hologram sheet to be embedded of the present invention will be explained, respectively.

1. Volume Hologram Layer

First, the volume hologram layer in the present invention will be explained. The volume hologram layer used in the present invention has a function of recording a refractive index difference by the principle of the volume hologram, and thereby realizing an optical image.

Moreover, the volume hologram layer used in the present invention has a configuration with a substrate disposed on either one side surface using an adhesion means.

(1) Component Materials

First, the component materials used for the volume hologram layer in the present invention will be explained.

The materials for providing the volume hologram layer used in the present invention are not particularly limited as long as it can record a volume hologram, the substrate can be disposed only on one side surface of the volume hologram layer using an adhesion means, and the peeling strength of the volume hologram layer and the substrate can be a predetermined value, so that a material used for a common volume hologram layer can be used optionally. As such a material, for example, known volume hologram recording materials such as a silver salt material, a bichromic acid gelatin emulsion, a photo polymerizable resin and a photo cross-linkable resin can be presented. In particular, in the present invention, (a) a first photosensitive material containing a resin material, a photo polymerizable compound, a photo polymerization initiator and a sensitizing pigment, or (b) a second photosensitive material containing a cationically polymerizable compound, a radically polymerizable compound, a photo radical polymerization initiator, and a photo cation polymerization initiator can be used preferably.

Hereafter, the first photosensitive material and the second photosensitive material will be explained successively.

(a) First Photosensitive Material

First, the first photosensitive material will be explained. As described above, the first photosensitive material includes a resin material, a photo polymerizable compound, a photo polymerization initiator and a sensitizing pigment.

(i) Resin Material

The resin material used in the present invention is not particularly limited as long as it can provide a volume hologram layer with the peeling strength of the volume hologram layer and the substrate to be described later of 25 gf/25 mm or more. As such a resin material to be used for the volume hologram layer, poly (meth) acrylate or a partially hydrolyzed product thereof, polyvinyl acetate or a partially hydrolyzed product thereof, polyvinyl alcohol or a partially acetalyzed product thereof, triacetyl cellulose, polyisoprene, polybutadiene, polychloroprene, polyvinyl chloride, polyallylate, chlorinated polyethylene, chlorinated polypropylene, poly-N-vinyl carbazole or a derivative thereof, poly-N-vinyl pyrrolidone or a derivative thereof, a copolymer of styrene and maleic anhydride or a half ester thereof, and a copolymer having as a polymerization component at least one selected from the copolymerizable monomer group such as acrylic acid, acrylate, acrylamide, acrylonitrile, ethylene, propylene, vinyl chloride and vinyl acetate can be used as examples. Moreover, these resins may be used as a mixture of plural kinds. In the present invention, it is preferable to use an acrylic resin as the main component out of the above-mentioned resins. Moreover, among the acrylic resins, it is particularly preferable to use a polymethyl methacrylate resin as the main component.

(ii) Photo Polymerizable Compound

As the photo polymerizable compound, photo polymerizable, photo cross-linkable monomers, oligomers, prepolymers having at least one ethylenically unsaturated bond in a molecule, or a mixture thereof described later can be used. Specifically, unsaturated carboxylic acid or salt thereof, ester of unsaturated carboxylic acid and an aliphatic polyhydric alcohol compound, an amide compound of unsaturated carboxylic acid and an aliphatic polyvaleic amine compound, can be presented.

Here, specific examples of the monomer of unsaturated carboxylic acid include acrylic acid, methacrylic acid, itaconic acid, crotonic acid, isocrotonic acid, and maleic acid. Moreover, specific examples of the monomer of ester of an aliphatic polyhydric alcohol compound and unsaturated carboxylic acid include, as the acrylate, ethylene glycol diacrylate, triethylene glycol diacrylate, 1,3-butane diol diacrylate, tetramethylene glycol diacrylate, propylene glycol diacrylate, neopentyl glycol diacrylate, trimethylol propane triacrylate, trimethylol propane tri(acryloyloxy propyl) ether, and trimethylol ethane triacrylate.

As the methacrylate, tetramethylene glycol dimethacrylate, triethylene glycol dimethacrylate, neopentyl glycol dimethacrylate, trimethylol propane trimethacrylate, and trimethylol ethane trimethacrylate can be presented as examples. Moreover, as the itaconate, ethylene glycol diitaconate, propylene glycol diitaconate, and 1,3-butane diol diitaconate can be presented as examples. Moreover, as the crotonate, ethylene glycol dicrotonate, tetramethylene glycol dicrotonate, pentaerythritol dicrotonate, and sorbitol tetracrotonate can be presented as examples. Furthermore, as the isocrotonate, ethylene glycol diisocrotonate, pentaerythritol diisocrotonate, and sorbitol tetraisocrotonate can be presented as examples. Moreover, as the maleate, ethylene glycol dimaleate, triethylene glycol dimaleate, pentaerythritol dimaleate, and sorbitol tetramaleate can be presented as examples.

As the halogenated unsaturated carboxylic acid, 2,2,3,3-tetrafluoro propyl acrylate, 1H,1H,2H,2H-heptadecafluoro decyl acrylate, and 2,2,3,3-tetrafluoro propyl methacrylate can be presented as examples.

Moreover, as specific examples of the monomer of an amide of unsaturated carboxylic acid and aliphatic polyvaleic amine compound, methylene bisacrylamide, methylene bismethacrylamide, 1,6-hexamethylene bisacrylamide, and 1,6-hexamethylene bismethacryl amide can be presented as examples.

(iii) Photo Polymerization Initiator

As the photo polymerization initiator used in the present invention, for example, 1,3-di (t-butyl dioxycarbonyl) benzophenone, 3,3',4,4'-tetrakis(t-butyl dioxycarbonyl) benzophenone, N-phenyl glycine, 2,4,6-tris(trichloro methyl)-s-triazine, 3-phenyl-5-isooxazolone, 2-mercaptobenzimidazole, and imidazole dimmers can be presented. In particular, it is particularly preferable that the photo polymerization initiator used in the present invention has a decomposition process after hologram recording from the viewpoint of stabilization of the recorded volume hologram. For example, organic peroxides are easily decomposed by ultraviolet ray irradiation, and thus it is preferable.

(iv) Sensitizing Pigment

As the sensitizing pigment used in the present invention, a thiopyrilium salt-based pigment, a merocyanine-based pigment, a quinoline-based pigment, a styryl quinoline-based pigment, a ketocoumarin-based pigment, a thioxanthene-based pigment, a xanthenes-based pigment, an oxonol-based pigment, a cyanine dye, a rhodamine dye, a thiopyrylium salt-based pigment, a pyrylium ion-based pigment, and a diphenyl iodonium ion-based pigment can be presented as examples.

(b) Second Photosensitive Material

Next, the second photosensitive material used in the present invention will be explained. As described above, the second photosensitive material contains a cationically polymerizable compound, a radically polymerizable compound, a photo radical polymerization initiator, and a cation polymerization initiator.

Here, in the case of using such a second photosensitive material, as the method of recording the volume hologram in the volume hologram layer, a method of directing a light beam for exposing the photo radical polymerization initiator such as a laser beam (first exposure), and then directing a light beam of a wavelength different from that of the laser beam for exposing the photo cation polymerization initiator is used.

(i) Cationically Polymerizable Compound

As the cationically polymerizable compound, from the viewpoint that polymerization of the radically polymerizable compound is carried out preferably in a composition of a relatively low viscosity, those that are liquid in a room temperature can be used preferably. As such a cationically polymerizable compound, for example, diglycerol diether, pentaerythritol polydiglycidyl ether, 1,4-bis(2,3-epoxy propoxy perfluoro isopropyl) cyclohexane, sorbitol polyglycidyl ether, 1,6-hexane diol glycidyl ether, polyethylene glycol diglycidyl ether, and phenyl glycidyl ether can be presented.

(ii) Radically Polymerizable Compound

As the radically polymerizable compound, those having at least one ethylenically unsaturated double bond in a molecule are preferable. Moreover, the average refractive index of the radically polymerizable compound used in the present invention is preferably larger than the average refractive index of the cationically polymerizable compound, and it is particularly preferably larger by 0.02 or more. This is due to formation of the volume hologram by the refractive index difference between the racially polymerizable compound and the cationically polymerizable compound. Therefore, in the case the average refractive index difference is same as or smaller than the above-mentioned value, the refractive index modulation is insufficient. As the radically polymerizable compound used in the present invention, for example, acrylamide, methacrylamide, styrene, 2-bromstyrene, phenyl acrylate, 2-phenoxy ethyl acrylate, 2,3-naphthalene dicarboxylic acid (acryloxy ethyl) monoester, methyl phenoxy ethyl acrylate, nonyl phenoxy ethyl acrylate, and β-acryloxy ethyl hydrogen phthalate can be presented.

(iii) Photo Radical Polymerization Initiator

The photo radical polymerization initiator used in the present invention is not particularly limited as long as it can produce an active radical by the first exposure at the time of recording the volume hologram so that the active radical polymerizes the radically polymerizable compound. Moreover, a sensitizer commonly regarded as a light absorbing component and an active radical generating compound or an acid generating compound may be used in combination. As such a sensitizer in the photo radical polymerization initiator, although a colored compound such as a pigment is frequently used for absorbing a visible laser beam, in the case of providing a colorless transparent hologram, it is preferable to use a cyanine-based pigment. Since the cyanine-based pigment is in general easily decomposed by a light, the pigment in the hologram is decomposed so as not to have absorption in a visible range by post-exposure in the present invention or being left for several hours to several days under an interior light or sunbeam, and as a result, a colorless transparent volume hologram can be obtained.

As the specific examples of the cyanine-based pigment, anhydro-3,3'-dicarboxy methyl-9-ethyl-2,2'thiacarbocyanine betaine, anhydro-3-carboxy methyl-3',9'-diethyl-2,2' thiacarbocyanine betaine, 3,3',9-triethyl-2,2'-thiacarbocyanine-iodate, 3,9-diethyl-3'-carboxy methyl-2,2'-thiacarbocyanine-iodate, 3,3',9-triethyl-2,2'-(4,5,4',5'-dibenzo) thiacarbocyanine-iodate, 2-[3-(3-ethyl-2-benzothiazolydene)-1-propenyl]-6-[2-(3-ethy 1-2-benzothiazolidene) ethylidene imino]-3-ethyl-1,3,5-thiadiazolium.iodate, 2-[[3-allyl-4-oxo-5-(3-n-propyl-5,6-dimethyl-2-benzothiazol yliden)-ethylidene-2-thiazolynylidene]methyl]3-ethyl-4,5-di phenyl thiazolinium-iodate, 1,1', 3,3,3', 3'-hexamethyl-2,2'-indotricarbocyanine.iodate, 3,3'-diethyl-2,2'-thiatricarbocyanine-.perchlorate, anhydro-1-ethyl-4-methoxy-3'-carboxy methyl-5'-chloro-2,2'-quinothia cyanine betaine, and anhydro-5,5'-diphenyl-9-ethyl-3,3'-disulfopropyl oxacarbocyanine hydroxide-triethyl amine salt can be presented. One kind or a combination of plural kinds thereof can be used.

As the active radical generating compound, for example, diaryl iodonium salts, or 2,4,6-substituted-1,3,5-triazines can be presented. In the case high photosensitivity is needed, it is particularly preferable to use diaryl iodonium salts. Specific examples of the diaryl iodonium salts include chlorides of diphenyl iodonium, 4,4'-dichloro diphenyl iodonium, 4,4'-dimethoxy diphenyl iodonium, 4,4'-ditertiary butyl diphenyl iodonium and 3,3'-dinitro diphenyl iodonium, bromides, tetrafluoro borate, hexafluoro phosphate, hexafluoro arsenate, hexafluoro antimonate, trifluoro methane sulfonate, and 9,10-dimethoxy anthracene-2-sulfonate. Moreover, specific examples of the 2,4,6-substituted-1,3,5-triazines include 2-methyl-4,6-bis(trichloro methyl)-1,3,5-triazine, 2,4,6-tris(trichloro methyl)-1,3,5-triazine, 2-phenyl-4,6-bis(trichloro methyl)-1,3,5-triazine, 2,4-bis (trichloro methyl)-6-(p-methoxy phenyl vinyl)-1,3,5-triazine, and 2-(4'-methoxy-1'-naphthyl)-4,6-bis(trichloro methyl)-1,3,5-triazine.

(iv) Photo Cation Polymerization Initiator

The photo cation polymerization initiator used in the present invention is not particularly limited as long as it is an initiator having a low sensitivity with respect to the first exposure at the time of recording the volume hologram but it is exposed by the post-exposure of directing a light beam of a wavelength different from that of the first exposure so as to generate a Bronsted acid or a Lewis acid for polymerizing the cationically polymerizable compound. In particular, in the present invention it is particularly preferable to use one not polymerizing the cationically polymerizable compound during the first exposure. As such a photo cation polymerization initiator, for example, diaryl iodonium salts, triaryl sulfonium salts, andiron arene complex can be presented. As a preferable example of the diaryl iodonium salts, the iodoniums shown in the photo radical polymerization initiator such as tetrafluoro borate, hexafluoro phosphate, hexafluoro arsenate, hexafluoro antimonate can be presented. As a preferable example of the triaryl sulfonium salts, triphenyl sulfonium, and 4-tertiary-butyl triphenyl sulfonium can be presented.

(2) Others

Since the volume hologram sheet to be embedded of the present invention is used while being introduced into a paper medium or being embedded in a card medium, the thickness of the volume hologram layer used in the present invention is preferably in a range of facilitating introduction into the paper medium or embedding into the card medium according to the substrate, and the like to be described later. Specifically, it is preferably in a range of 0.1 µm to 50 µm, and it is particularly preferably in a range of 1 µm to 20 µm.

2. Substrate

The substrate used in the present invention is disposed on only either one surface of the volume hologram layer using an adhesion means.

Here, the substrate in the present invention denotes those having the melting temperature higher than that of the above-mentioned heating condition. This is because in the case the melting temperature of the substrate is same as or lower than the heating condition, introduction into the paper medium or embedding into the card medium of the volume hologram sheet to be embedded of the present invention becomes difficult.

As a material for the substrate, specifically, resins including polyester resins such as polyethylene, polypropylene, polyethylene fluoride, polyvinylidene fluoride, polyvinyl chloride, polyvinylidene chloride, ethylene-vinyl alcohol copolymer, polyvinyl alcohol, polymethyl methacrylate, polyether sulfone, polyether ether ketone, polyamide, tetrafluoroethyle-perfluoloalkyl vinyl ether copolymer, and polyethylene terephthalate and plyimide resins can be presented. In particular, it is preferable to use the polyester resins. Furthermore, among the polyester resins, it is preferable to use polyethylene terephthalate.

Since a substrate made of the above-mentioned resins is used, at the time of producing a forgery prevention paper, a card, and the like using the volume hologram sheet to be embedded under a heating condition, a volume hologram sheet to be embedded having a preferable mechanical strength can be provided.

The substrate may use only one kind of the resin, or it may use a mixture of plural kinds thereof.

The substrate used in the present invention may have transparency, or it may not have transparency. Moreover, the substrate may be colored to the extent that the volume hologram layer can be recognized visibly.

In the present invention, the substrate may include an additive. As such an additive, those having a function of improving the visibility of the optical image of the volume hologram layer in the volume hologram sheet to be embedded of the present invention and those having a function of providing a design property to the volume hologram sheet to be embedded of the present invention can be presented. As such an additive, for example, coloring agents such as dyes and pigments, ultraviolet ray absorbing agents and stabilizing agents for providing the weather resistance can be presented. In the case the substrate includes an ultraviolet ray absorbing agent, it can serve also as the ultraviolet ray prevention layer to be described later. In the case the substrate serves also as the ultraviolet ray prevention layer, a substrate with the ultraviolet ray absorbing agent included can be used.

The thickness of the substrate used in the present invention is preferably in a range capable of introducing the thickness of the volume hologram sheet to be embedded of the present invention into a paper medium or embedding the same into a card according to the thickness of the volume hologram layer, and the like. More specifically, it is preferably in a range of 2 µm to 50 µm, and it is particularly preferably in a range of 6 µm to 25 µm.

3. Adhesion Means

The adhesion means used in the present invention is used for disposing the substrate on only one side surface of the volume hologram layer.

Such an adhesion means is not particularly limited as long as it can bond the volume hologram layer and the substrate such that the peeling strength of the volume hologram layer and the substrate is 25 gf/25 mm or more. Specifically, an adhesive layer and an easy adhesion process can be presented. Hereafter, the adhesive layer and the easy adhesion process will be explained, respectively.

(1) Adhesive Layer

The adhesive layer used in the present invention is formed between the volume hologram layer and the substrate for adhesion such that the peeling strength of the volume hologram layer and the substrate is 25 gf/25 mm or more.

The adhesive used for the adhesive layer is not particularly limited as long as the peeling strength of the volume hologram layer and the substrate can be in the above-mentioned range, but it is preferably a curable adhesive. Here, the "curable adhesive" in the present invention denotes the so-called thermosetting adhesives, energy line curable adhesives, and the like to be cured by formation of a mesh structure by cross-linking caused by chemical reaction by the stimulus of heat or energy line (ultraviolet ray or electron beam) Since the curable adhesive is used, a preferable mechanical strength can be provided to the volume hologram sheet to be embedded of the present invention at the time of producing a forgery prevention paper, a card, and the like under a heating condition.

In the present invention, as the curable adhesive, both a photo setting adhesive and a thermosetting adhesive can be used.

As a curable adhesive used in the present invention, in particular, it is preferable to use a thermosetting adhesive. Moreover, as the thermosetting adhesive, it is particularly preferable to use a solvent-based thermosetting adhesive. Since the solvent-based thermosetting adhesive is used, a preferable mechanical strength can be provided to the volume hologram sheet to be embedded of the present invention at the time of producing a forgery prevention paper, a card, and the like under a heating condition.

The adhesive layer may include an ultraviolet ray absorbing agent. In the case the adhesive layer includes an ultraviolet ray absorbing agent, it can serve also as the ultraviolet ray prevention layer to be described later.

The thickness of the adhesive layer is not particularly limited as long as the bonding property can be realized to the extent of having the peeling strength of the volume hologram layer and the substrate of the predetermined value, but it is preferably in a range of 1 µm to 10 µm. In the case the film thickness of the adhesive layer is lower than the above-mentioned range, it is difficult to have the peeling strength of the volume hologram layer and the substrate in the predetermined range. Moreover, in the case the film thickness of the adhesive layer exceeds the above-mentioned range, since the film thickness of the volume hologram sheet to be embedded of the present invention becomes too thick so that surface ruggedness is conspicuous in the case of being introduced into a paper medium or being embedded in a card.

(2) Easy Adhesion Process

The easy adhesion process used in the present invention is not particularly limited as long as the volume hologram layer and the substrate can be bonded such that the peeling strength of the volume hologram layer and the substrate is 25 gf/25 mm or more. For example, physical processes such as plasma process, corona discharge process, glow discharge process and flame process, and chemical processes using cromic acid, a silane coupling agent, and a primer agent can be presented.

In the present invention, a chemical process using a primer agent is particularly preferable. As the primer agent, those processed at the time of the substrate film production and those processed on the substrate film after production are both preferable. As such a substrate film processed with the primer agent, these commercially available can be used. Specifically, for example, a PET film with an easy adhesive layer A4100™, T4100™ produced by Toyobo Co., Ltd., a Teijin (registered trademark) Tetoron (registered trademark) film HPE produced by Teijin DuPont Films Japan Limited, Emblet (registered trademark) S, PTM, PET produced by Unitika Limited, and an easy adhesion material AC-X™, AC-L™, AC-W™ produced by Panac Corporation, and the like can be presented. Moreover, the primer agent for processing on the substrate film after production may be a material adheres to the volume hologram material. In particular, an acrylic resin material is preferable, and furthermore, those including as the main component a methacrylic resin such as polymethyl methacrylate and as an additive a material having a low glass transition point for improving adhesion properties are preferable. Moreover, other than the acrylic resin, a mixture of a polyurethane material and a curing agent can also be used preferably. Thereby, a preferable mechanical strength can be provided to the volume hologram sheet to be embedded of the present invention at the time of producing a forgery prevention paper, a card, and the like under a heating condition.

In the case the primer agent is present as a layer in the substrate film processed with the primer agent, the layer thickness is preferably 1 μm or less.

4. Combination of Volume Hologram Layer, Substrate and Adhesion Means

The volume hologram sheet to be embedded of the present invention is not particularly limited as long as, by combining the above-mentioned volume hologram layer, substrate and adhesion means, it has the predetermined film thickness and the peeing strength of the volume hologram layer and the substrate of 25 gf/25 mm or more. In the present invention, as the combination of the volume hologram layer, the substrate and the adhesion means, the following combinations can be used preferably.

As the combination of the volume hologram layer, the substrate, and the adhesion means, one in which the main component of the resin material used in the volume hologram layer being an acrylic resin, the substrate made of a polyester resin, and the adhesion means being an adhesive layer, and the adhesive layer using a thermosetting adhesive is preferable. Moreover, among the combinations, one in which the main component of the resin material being a polymethyl methacrylate-based resin material, the substrate made of a polyethylene terephthalate-based resin, and the adhesive layer using as the adhesive a solvent-based thermosetting adhesive is more preferable. By making the combination of the volume hologram layer, the substrate and the adhesive layer as the above-mentioned combination, a volume hologram sheet to be embedded having a preferable mechanical strength can be provided at the time of producing a forgery prevention paper, a card, and the like under a heating condition.

5. Other Members

The volume hologram sheet to be embedded of the present invention is not particularly limited as long as the volume hologram layer and the substrate are disposed using the above-mentioned adhesion means, and thus a necessary member may be added optionally. As such a member, for example, a heat seal layer disposed on the outermost layer of the volume hologram sheet of the present invention can be presented.

Moreover, as needed, the volume hologram sheet to be embedded of the present invention may be provided with other layers such as a protection layer, a colored layer, a magnetic printing layer, a fluorescent light emitting layer including an ultraviolet ray light emitting layer and an infrared ray light emitting layer, an optically variable ink layer called OVI (optical variable ink) layer and/or a resin layer, and/or a printing layer, a primer layer between the layers of the layer configuration (except between the volume hologram layer and the substrate) and/or the surface. In particular, it is effective to dispose a colored layer on the surface opposite to the surface in contact with the substrate on the volume hologram layer.

Furthermore, as needed, the volume hologram sheet to be embedded of the present invention may be provided with an ultraviolet ray prevention layer at an optional position on the side closer to the substrate with respect to the volume hologram layer.

Hereafter, the heat seal layer, the colored layer and the ultraviolet ray prevention layer will be explained.

(1) Heat Seal Layer

In the present invention, a heat seal layer may be disposed on the outermost layer of the volume hologram sheet.

Here, the heat seal layer is a heat sensitive adhesive to be molten or softened at a predetermined temperature. For example, in the case the volume hologram sheet to be embedded of the present invention is a volume hologram sheet for a thread, the heat seal layer is a heat sensitive adhesive to be molten or softened at the temperature of the drying zone of the paper producing machine used at the time of producing a forgery prevention paper, and the like using the volume hologram sheet for a thread. Moreover, for example, in the case the volume hologram sheet to be embedded of the present invention is a volume hologram sheet for a card, the heat seal layer is a heat sensitive adhesive to be molten or softened at the temperature in the press laminate process of the heat press.

As the heat seal layer, known heat sensitive adhesives based on such as ionomer resins, polyester resins, polyvinyl acetate resins, polyvinyl chloride resins, polyacrylate resins, ethylene-vinyl acetate copolymer resins, and polyvinyl alcohol resins can be used. The coating amount is in general 0.1 g/m$^2$ to 10 g/m$^2$ (dry mass equivalent). The heat seal layer may, as needed, include a blocking prevention agent, a lubricant, a coloring agent, and a fluorescent light emitting agent such as an ultraviolet ray light emitting agent and an infrared ray light emitting agent. Moreover, the heat seal layer may include an ultraviolet ray absorbing agent. In the case the heat seal layer includes an ultraviolet ray absorbing agent and it is disposed on the substrate side, it can serve also as the ultraviolet ray prevention layer to be described later.

As to the arrangement of the heat seal layer, the heat seal layer may be disposed on the outermost layer of the volume hologram sheet. For example, it may be disposed on the volume hologram layer side of the volume hologram sheet, it may be disposed on the substrate side of the volume hologram sheet, or it may be disposed both thereof.

(2) Colored Layer

Figure 3:
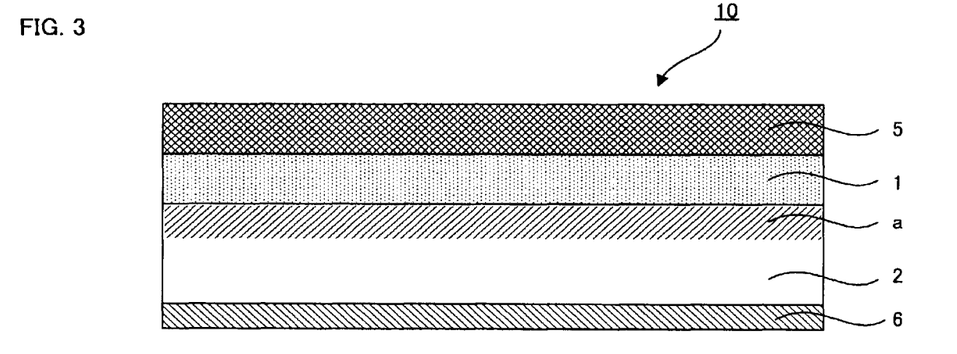
FIG. 3 is a schematic cross-sectional view showing yet another embodiment of a volume hologram sheet to be embedded of the present invention.
Figure 4:
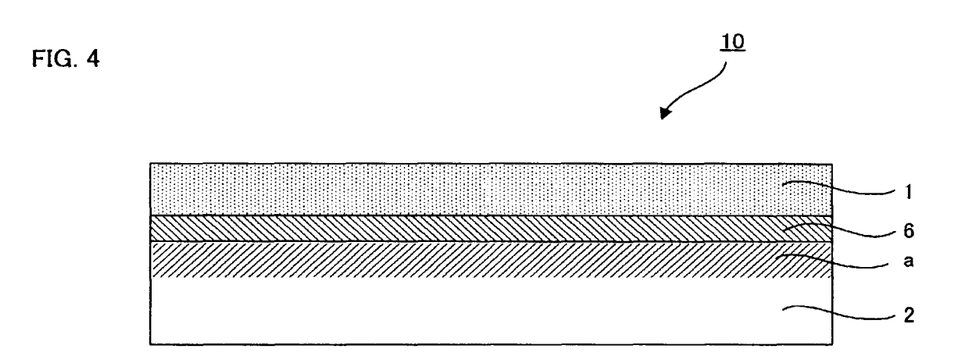
FIG. 4 is a schematic cross-sectional view showing still another embodiment of a volume hologram sheet to be embedded of the present invention.
Figure 5A:
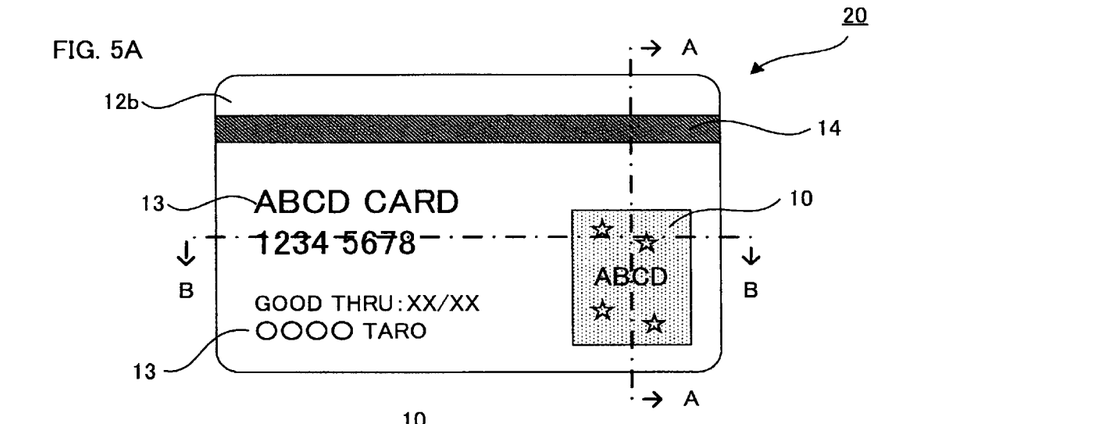
FIGS. 5A to 5C are each a schematic diagram showing an embodiment of a card of the present invention.
Figure 5B:
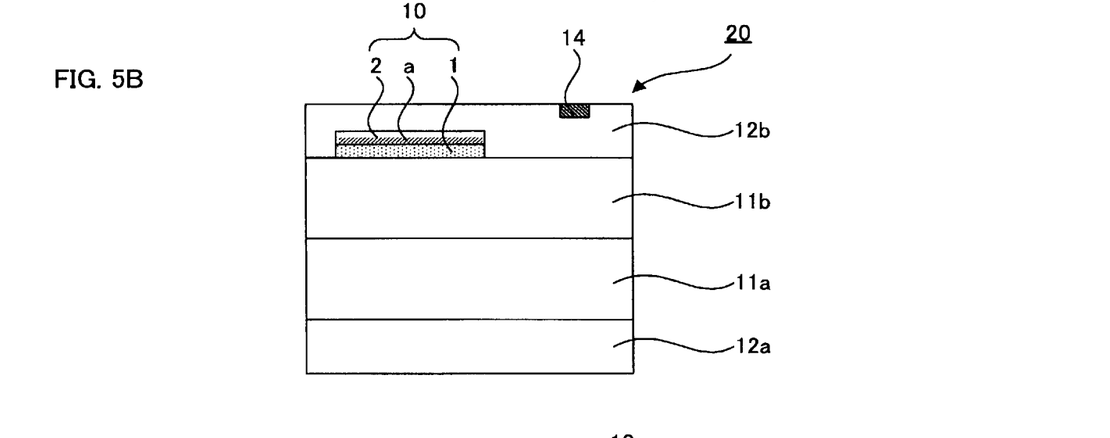
Figure 5C:
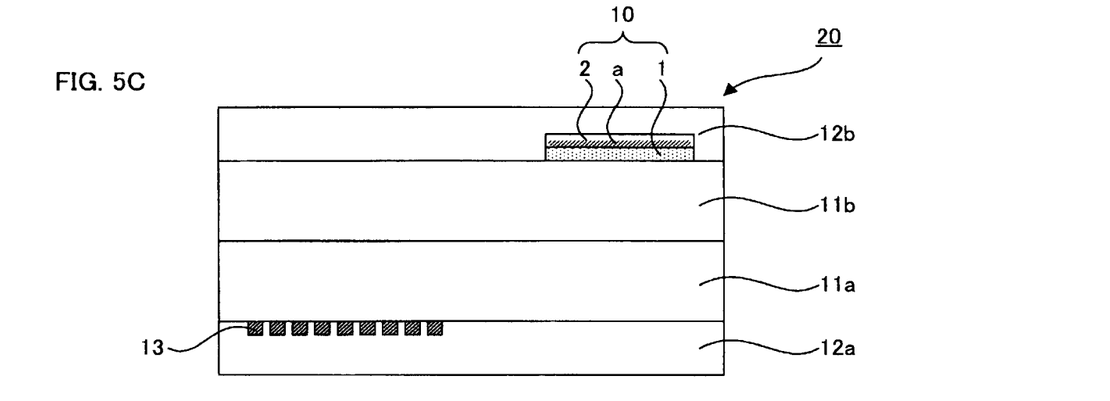
Figure 6:
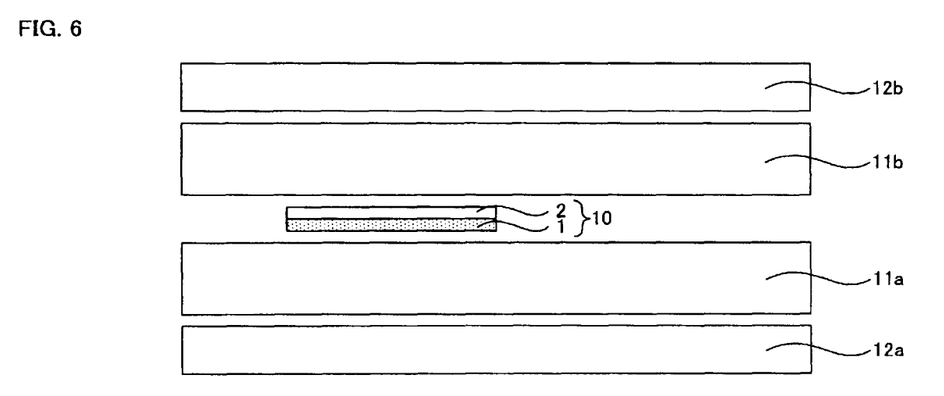
FIG. 6 is a schematic cross-sectional view showing another embodiment of a card of the present invention.

In the present invention, for example as shown in FIG. 3, a colored layer 5 may be disposed on the surface on the opposite side of the substrate 2 of the volume hologram layer 1.

Unlike the surface relief hologram, since the volume hologram does not require a reflection layer of an inorganic metal compound such as aluminum, effective design can be enabled by introducing a colored layer as the background of the hologram. According to the surface relief hologram requiring a reflection layer of aluminum, silver color of the aluminum is observed in any observation angle and at the same time the relief hologram

What is claimed is:

1. A card comprising a core sheet, a volume hologram sheet, and an over sheet,
   wherein the volume hologram sheet is embedded between the core sheet and the over sheet,
   the volume hologram sheet includes a volume hologram layer, a substrate, and an adhesion means,
   a peeling strength of the volume hologram layer and the substrate is 144 gf/25 mm or more,
   the adhesion means is an adhesive layer using a solvent-based thermosetting adhesive, and
   the adhesive layer is laminated between a first surface of the volume hologram layer and the substrate,
   wherein the volume hologram layer comprises epoxy group—containing acrylic resin, polyvinyl acetate, 1,6-hexane diol diglycidyl ether, diphenoxy ethanol fluoride diacrylate, diaryl iodonium salt, and 2,5-bis(4-diethyl amino benzylidene) cyclopentanone.

2. The card according to claim 1, wherein the peeling strength is measured based on the 180-degree peeling test.

3. The card according to claim 1, wherein the core sheet and the over sheet are made from similar materials.

4. The card according to claim 1, wherein a main component of a resin material used in the volume hologram layer is an acrylic resin material, and the substrate includes a polyester resin.

5. The card according to claim 1, wherein the over sheet is transparent, and the core sheet is opaque.

* * * * *